No. 12,428. REISSUED JAN. 2, 1906.

J. LAFORÊT.

SHUTTLE BRAKE.

APPLICATION FILED DEC. 21, 1904.

WITNESSES:

Wm. Bell.

Adele Glatt.

INVENTOR,

Jean Laforêt,

BY

Gartner & Linvand,

ATTORNEYS.

UNITED STATES PATENT OFFICE.

JEAN LAFORÊT, OF ETOILE, FRANCE, ASSIGNOR TO ALBERT B. STRANGE, OF NEW YORK, N. Y.

SHUTTLE-BRAKE.

No. 12,428. Specification of Reissued Letters Patent. Reissued Jan. 2, 1906.

Original No. 762,642, dated June 14, 1904. Application for reissue filed December 21, 1904. Serial No. 237,867.

*To all whom it may concern:*

Be it known that I, JEAN LAFORÊT, a citizen of the French Republic, residing at Etoile, Department de la Drome, France, have invented new and useful Improvements in Shuttle-Brakes, of which the following is a specification.

This invention relates to improvements in shuttle-brakes.

With the looms hitherto used it frequently occurs, especially when the speed of working is irregular, that the shuttle after entering its box recedes again to some extent, owing to the impact produced. This produces irregularities in the unwinding of the thread, looping of the weft, and consequently frequent ruptures.

My invention is illustrated in elevation in the annexed drawings, in which—

Figure 1:
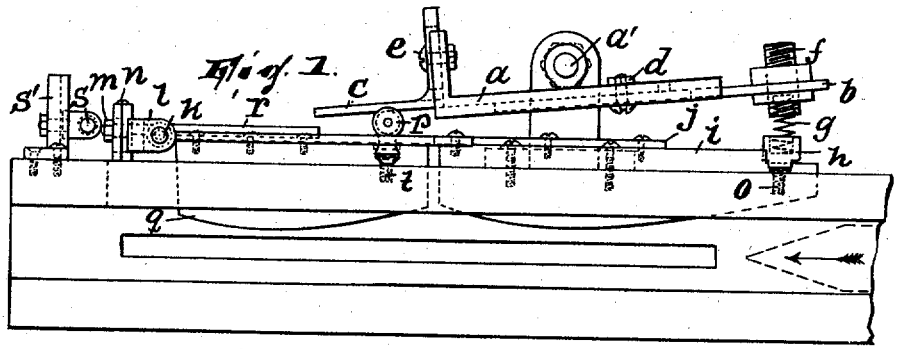
Figure 2:
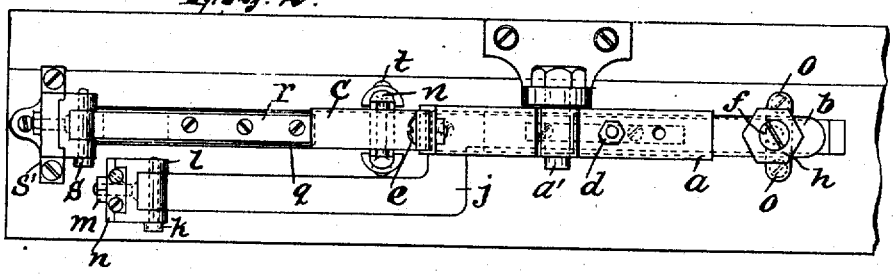
Figure 3:
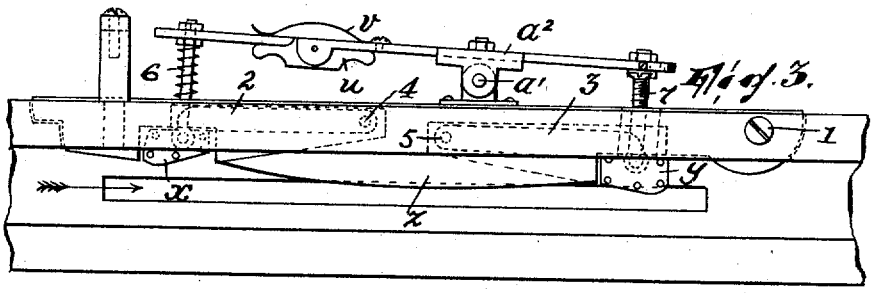
Figure 4:
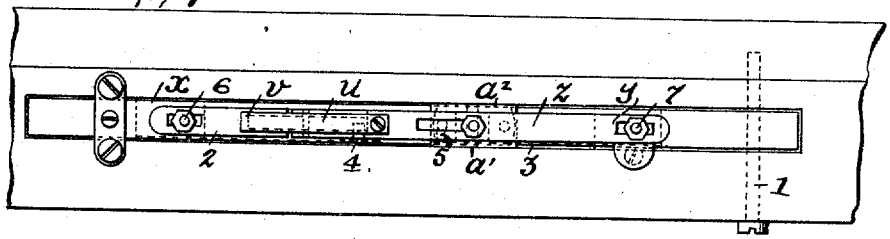

Figure 1 is a plan, and Fig. 2 an elevation, representing one form of construction; and Fig. 3 a plan, and Fig. 4 an elevation, of modification specially adapted for looms having a plurality of shuttles.

The object of my invention is to remove the disadvantage referred to by positively locking each shuttle when it arrives at the end of its travel in such a manner that it is not released again till the next stroke of the picker.

Referring to Figs. 1 and 2, the apparatus essentially comprises an oscillating part *a*, pivoted at *a'* and having the shape of an angle square provided with grooves, in one of which a rule *b* is adapted to be moved and in the other an angle square *c*. The rule *b* and square *c* are adapted to be held in adjustment by means of screws *d* and *e*, respectively. Through the end of the rule *b* passes a hollow screw *f*, in which is arranged a spring *g*, which bears on a collar or cup *h*, fixed to one of the cam-levers *i*, which act as brakes for cushioning the shuttle. This lever *i* is preferably made of wood and is fixed to a metal plate *j*, pivoted at *k* to a support *l*, the position of which can be regulated to and from the shuttle-box along a dovetail guide on the bracket *n* and held, by means of a pin and nut *m*, on bracket *n*. The stroke of the lever *i* can be regulated by means of the screw *o*, which can be screwed to a greater or less distance into the lay, according to the efficacy of the brake action required. The square *c* rests against the bridge *p*, fixed to the end of the second cam-lever *q*. This lever is also preferably made of wood and is fixed to a metal rule *r*, pivoted at *s* to a support horizontally adjustable on the bracket *s'*. The extent to which the lever moves is regulated by the screw *t*. This arrangement allows of regulating the respective lengths and positions of the various parts and of adapting the apparatus to looms of all sizes and kinds.

The action of the apparatus is as follows: When the shuttle is thrown in the direction of the arrow, it first rubs against the curved part of the lever *i* and causes the latter to rotate about its pivot *k* and at the same time the part *a* to rotate about its pivot *a'*. The shuttle then rubs against the curved part of the lever *q*, which rotates about *s* and pushes, by means of the bridge *p*, the square *c* of the part *a*. The latter then oscillates in the opposite sense to that previously described, and the lever *i* is moved by the pressure of the screw *f*. The shuttle is then locked between the two curved levers and cannot move back except when it receives sudden impulse given by the picker. The latter preferably consists of a suitable number of thin wooden blades fastened together side by side and then cut in the ordinary way.

The modification illustrated in Figs. 3 and 4 is based on the same principle and has the advantage of occupying less room, so that it can be conveniently used in looms having several shuttles. The part $a^2$ is preferably made in two parts, one of which has a shoulder *u*, preventing the movement in one direction, whereas a spring *v* gives a relative elasticity in the other direction. The curved levers of the form of construction previously described are replaced by two small projections *x y*, arranged in recesses in the lever *z*, which is pivoted at 1. These projections are respectively fixed to the blades 2 3, pivoted at 4 and 5 and connected by the screws 6 7 with the oscillating lever $a^2$. By this arrangement the shuttle when moving in the direction of the arrow moves the projection *x* and passes by the lever *z* and then moves the projection *y*, which causes the lever $a^2$ to oscillate and presses the first projection strongly against the shuttle, which is thus held fast at three points—*i. e.*, at both its end portions and at the middle—and cannot move until the stroke of the picker releases it.

I claim—

1. In a loom shuttle-box, the combination with two successively-operative shuttle-brakes, of an oscillatory beam bearing at its ends respectively against the one and other of said brakes for the purpose set forth.

2. In a loom shuttle-box, the combination with two successively-operative pivoted shuttle-brakes, of an oscillatory beam having adjustable bearing at its ends respectively against the one and other of said brakes for the purpose set forth.

3. In a loom shuttle-box, the combination with two successively-operative shuttle-brakes, of an oscillatory beam bearing at one end positively against the rearmost brake and at the other end resiliently against the foremost brake for the purpose set forth.

4. In a loom shuttle-box, the combination with two successively-operative shuttle-brakes, of an oscillatory beam adjustable in length and having horizontally-adjustable ends bearing respectively against the one and other of said brakes for the purpose set forth.

5. In a loom, the combination, with the batten or lay structure and with the shuttle, of two successively-operative shuttle-brakes, and an oscillatory beam adapted to bear at its ends respectively against the one and the other of said brakes, said shuttle-brakes being spaced a distance corresponding to the length of the shuttle whereby to bear against both end portions thereof when the shuttle is completely boxed, substantially as described.

6. In a loom, the combination, with the batten or lay structure and with the shuttle, of two successively-operative shuttle-brakes, and an oscillatory beam adapted to bear at its ends respectively against the one and the other of said brakes and against one of them resiliently, said shuttle-brakes being spaced a distance corresponding to the length of the shuttle whereby to bear against both end portions thereof when the shuttle is completely boxed, substantially as described.

In testimony that I claim the foregoing I have hereunto set my hand this 29th day of November, 1904.

JEAN LAFORÊT.

Witnesses:

ARCHIBALD R. BAKER,
JOHN BAKER.